United States Patent
Rupp et al.

(10) Patent No.: US 7,020,711 B2
(45) Date of Patent: Mar. 28, 2006

(54) METHOD FOR ADJUSTING THE DATA TRANSMISSION RATE IN A FIELDBUS SYSTEM

(75) Inventors: Roland Rupp, Hattenhofen (DE); Klaus Wohnhaas, Fellbach (DE); Hans Schwenkel, Stuttgart (DE)

(73) Assignee: Pilz GmbH & Co., Ostfildern (DE)

( * ) Notice: Subject to any disclaimer, the term of this patent is extended or adjusted under 35 U.S.C. 154(b) by 726 days.

(21) Appl. No.: 10/071,035

(22) Filed: Feb. 8, 2002

(65) Prior Publication Data

US 2002/0091838 A1 Jul. 11, 2002

Related U.S. Application Data

(63) Continuation of application No. PCT/EP00/07583, filed on Aug. 4, 2000.

(30) Foreign Application Priority Data

Aug. 20, 1999 (DE) ................. 199 39 568

(51) Int. Cl.
*G06F 15/16* (2006.01)
(52) U.S. Cl. ..................... 709/233; 710/307
(58) Field of Classification Search ................ 709/223, 709/227, 233, 232, 234; 370/463, 229; 700/83; 710/307, 29; 713/323, 324
See application file for complete search history.

(56) References Cited

U.S. PATENT DOCUMENTS

| | | | |
|---|---|---|---|
| 4,825,362 A | 4/1989 | Minami et al. | |
| 4,853,850 A | 8/1989 | Krass, Jr. et al. | |
| 5,124,943 A | 6/1992 | Lubarsky | |
| 5,446,846 A | 8/1995 | Lennartsson | |
| 5,881,240 A | 3/1999 | Asano | |
| 6,047,222 A * | 4/2000 | Burns et al. | 700/79 |
| 6,141,596 A * | 10/2000 | Gretta et al. | 700/83 |
| 6,397,114 B1 * | 5/2002 | Eryurek et al. | 700/51 |
| 6,421,570 B1 * | 7/2002 | McLaughlin et al. | 700/2 |
| 6,501,995 B1 * | 12/2002 | Kinney et al. | 700/1 |
| 6,564,268 B1 * | 5/2003 | Davis et al. | 710/11 |
| 6,738,388 B1 * | 5/2004 | Stevenson et al. | 370/465 |

FOREIGN PATENT DOCUMENTS

EP 0 559 214 A1 9/1993

* cited by examiner

*Primary Examiner*—David Wiley
*Assistant Examiner*—Kyung Hye Shin
(74) *Attorney, Agent, or Firm*—Cohen, Pontani, Lieberman & Pavane

(57) ABSTRACT

The invention relates to a method for adjusting the data transmission rate in a fieldbus system (10) which is suitable to control safety-critical processes and which comprises at least one subscriber (12, 14) connected to a fieldbus (20), wherein in a first phase the subscriber/subscribers log on at a unit (30/central unit) centrally connected to the fieldbus with a first low data transmission rate. In a second phase the central unit (30) sets the data transmission rate at the subscriber/subscribers (12, 14) to a predetermined higher second value. In a third phase the subscriber/subscribers (12, 14) log on again at the central unit with a higher data transmission rate; and the central unit (30) shuts down the fieldbus (20) if it detects a deviation of the number of subscribers (12, 14) logged on in the first and the third phase. The invention also relates to a fieldbus system for implementing said method

11 Claims, 2 Drawing Sheets

METHOD FOR ADJUSTING THE DATA TRANSMISSION RATE IN A FIELDBUS SYSTEM

CROSSREFERENCES TO RELATED APPLICATIONS

This application is a continuation of copending international patent application PCT/EP00/07583 filed on Aug. 4, 2000 and designating the U.S., which claims priority of German patent application DE 199 39 568.3 filed on Aug. 20, 1999.

BACKGROUND OF THE INVENTION

The present invention relates to a method for adjusting the data transmission rate in a fieldbus system that is suitable for controlling safety-critical processes and that comprises at least one subscriber connected to a fieldbus. The invention further relates to a fieldbus system for controlling safety-critical processes having a fieldbus to which at least one subscriber is connected.

Fieldbus systems of the afore-mentioned kind have been used for a long time in most different fields and for most different purposes. For example, a safety device having a microprocessor is disclosed in the published application DE 42 42 936 A1 in which a fieldbus is proposed for transmission of data. Further systems are disclosed in EP 0 559 214 A1, U.S. Pat. Nos. 4,835,850, 5,446,846 or 4,825,362.

The term fieldbus system is generally understood as a system for data communication to which, ideally, any desired number of subscribers can be connected that communicate with each other via the common fieldbus. The communication between the subscribers via the fieldbus is governed by specified protocols. Such a communication system is in contrast to a individual point-to-point communication link between two subscribers where other subscribers are completely excluded from the communication. Examples of known fieldbus systems are the so-called CANbus, the so-called Profibus or the so-called Interbus.

Although the use of fieldbuses offers numerous advantages, mainly with respect to the high wiring effort that would otherwise be required. It was not possible herebefore to employ fieldbuses in practical use for controlling safety-critical processes. The reason is that due to the structure being freely accessible for any subscriber, the degree of fail safety necessary for controlling safety-critical processes could not be guaranteed. The applicant has however developed a fieldbus system in the meantime which also meets the demands for safety-critical processes.

The term safety-critical process is understood in the present invention to describe a process which, in case of a fault, would present a risk for people and goods that may not be neglected. Ideally, it must be hundred percent guaranteed for any safety-critical process that the process will be transferred to a safe state in case a fault should occur. Such safety-critical processes may also be partial processes of larger, higher-level overall processes. Examples for safety-critical processes are chemical processes, where it is an absolute necessity to keep critical parameters within predetermined limits, or complex machine controls, such as the control of a hydraulic press or of an entire production line. In the case of a hydraulic press, for example, the material feeding process may be a non-safety-critical partial process, whereas the process of starting the pressing tool may be a safety-critical partial process as part of the overall process. Other examples of (partial) safety-critical processes are the monitoring of guards, protective doors or light barriers, the control of two-hand switches or the reaction to emergency stop devices.

One of the most important demands to a fieldbus system for controlling safety-critical processes is a defined and fast response time which does not play a role in known systems for data transmission, for example via modem. Such a fieldbus system must be able to stop or terminate the process within a predetermined defined response time, for example in response to pushing an emergency shut-down switch as to avoid any possible damage. The achievable response time mainly depends on the transmission rate of the fieldbus system. A high data transmission rate results in a short response time, since the load of the fieldbus decreases compared with the lower data transmission rate with the same number of subscribers. Hence, also the time period is reduced for which a subscriber has to wait at the most before the fieldbus is enabled for its own transmission of data.

Due to that, it is desirable to operate with a very high data transmission rate. However, this leads to the problem that the transmission quality between the transmitter and the subscriber being located farther away decreases when the data transmission rate is increased.

It is therefore apparent that the adjustment of the data transmission rate in a fieldbus system for controlling safety-critical processes plays a very important role. Approaches for adjusting the data transmission rate in a bus system are for example disclosed in EP 0 896 449 A2, U.S. Pat. Nos. 5,124,943 or 5,881,240.

Typically, the data transmission rate in a fieldbus system is adjusted manually by providing respective adjustment devices at the subscribers of the fieldbus system. These adjustment devices are for example provided as DIP-switches.

It is obvious that the adjustment of the data transmission rate by doing so is very complex and susceptible to faults. Particularly in large fieldbus systems having a plurality of subscribers, it is not unlikely that the data transmission rate will be adjusted at one subscriber incorrectly by mistake. This leads to the result that the subscriber is not able to communicate via the fieldbus anymore. This could lead to fatal results when used for safety-critical processes.

Since the maximum possible data transmission rate decreases with the length of the data transmission path, it is often necessary to reduce the data transmission rate when extending a fieldbus system already present so that also the most distant subscriber is still able to communicate. However, this has the effect that the data transmission rate has to be reduced at all subscribers of the fieldbus system, since the subscribers connected to the fieldbus must transmit generally with same data transmission rate.

SUMMARY OF THE INVENTION

The object of the present invention is therefore to improve the method for adjusting the data transmission rate of the afore-mentioned kind and the fieldbus system of the afore-mentioned kind such that an easy and flexible adjustment is achievable wherein particularly the response time of the fieldbus system remains within the requested range. The adjustment of the data transmission rate may have particularly no influence on the safety of the fieldbus system.

The object underlying the invention is achieved with a method as mentioned at the outset, wherein in a first phase the subscriber or subscribers log on at a lower first data transmission rate to a central unit linked to a fieldbus and wherein in a second phase the central unit increases the data transmission rate of the subscriber or subscribers to a predetermined second higher value.

In connection with the present invention, subscriber is to be understood as any unit being connected to the fieldbus. For example, controlling units (clients) as well as signal units (server) are designated as subscribers. A differentiation between controlling unit and signal unit is not necessary for describing the present invention.

The advantage of the present invention is that by using the central unit an adjustment of the data transmission rate is possible which also meets safety-critical demands. After switching on the fieldbus system, first it is checked which subscriber is connected to the fieldbus. The central unit uses the lowest data transmission rate, for example 20 kBaud. The low data transmission rate guarantees that all subscribers can be reached regardless of the data transmission path. Thereafter, the central unit transmits a telegram to the connected subscribers with the instruction to increase the data transmission rate to a predetermined higher value (target value). This target value is selected as to meet all safety-critical parameters, like busload, response time etc. The adjustment of the data transmission rate is terminated therewith.

The method according to the present invention therefore allows to adjust the data transmission rate very easily and flexibly without having to operate manually at the individual subscribers. Rather the user adjust or set the admissible (found as safe before) data transmission rate at the central unit for the present fieldbus system. The object of the invention is therefore completely solved.

In a preferred embodiment of the invention, in a third phase the subscriber or subscribers log on again at the central unit with the higher data transmission rate and the central unit shuts down the fieldbus when detecting a difference (inconsistency) in the number of subscribers logged on in the first and the third phase.

This measure has the advantage that the safety of the fieldbus system is increased. Should a subscriber logged on in the first phase not being able to log on again with a higher data transmission rate, because it is too far away from the transmitter, for example, the fieldbus will be immediately shut down. The process being controlled via the fieldbus system will then be transferred in a safety sate in response thereto.

In a preferred embodiment of the invention, the first phase will begin with switching on the fieldbus system.

This measure has the advantage that the data transmission is performed with the lower first data transmission rate in a stage in which the safety-critical process to be controlled is not yet running so that the low data transmission rate being present only for a short period and the longer response time associated therewith are not critical.

In a preferred embodiment, the central unit transmits data telegrams to all subscribers in the second phase, wherein the data telegrams comprise the instruction for switching the data transmission rate to the second value. Preferably, the central unit terminates the third phase if a predetermined time period has lapsed since the last log-on of a subscriber without a new log-on of a subscriber.

This measure has the advantage that the procedure of adjusting the data transmission rate uses the present safety mechanisms in the fieldbus system by transmitting data telegrams so that the likelihood of a fault adjustment of a data transmission rate is very low.

Preferably, the first value of the data transmission rate is the standard transmission rate, for example 20 kBaud, and the second value is the target value of the fieldbus system, for example 250 kBaud. These values have been proven as particularly advantageous in practical use.

In a preferred embodiment, a new subscriber being connected to the fieldbus after the lapse of the third phase determines the data transmission rate on the fieldbus and logs on at the central unit with this data transmission rate.

This measure has the advantage that the fieldbus system has not to be shut down completely as to be able to connect a new subscriber. If the subscriber is not able to log on at the central unit, the fieldbus system can be restarted as to run the process for adjusting the data transmission rate once again, wherein a new second value can then be used.

The object underlying the invention can also be achieved with a fieldbus system as mentioned at the outset in that a central unit is provided which communicates with the subscribers via the fieldbus and comprises a switching device for switching the data transmission rate on the fieldbus and at the subscribers from a first lower value to a second higher value.

This fieldbus system according to the present invention allows to adjust the data transmission rate very easily by using the central unit provided only once in the system, the data transmission rate being adopted by all of the subscribers connected to the fieldbus. If one or more subscribers are not able to log on at the central unit with the higher data transmission rate determined by the switching device, the fieldbus system is shut down immediately. The safety-critical process controlled by the fieldbus system will then be transferred into a safe state so that the subscriber not or incorrectly transmitting will not cause any damages.

In a preferred embodiment, the central unit comprises a first memory unit storing first and second values of the data transmission rate. Preferably, the central unit comprises first and second memory units for storing log-on data, the log-on data being transmitted by the subscribers connected to the fieldbus.

Preferably, the central unit comprises a comparator which compares the log-on data stored in the second and third memory units, wherein the central unit performs a shutdown of the fieldbus in case of a non-correspondence.

Further, it is preferred that the central unit comprises a time measuring device which is connected to the comparator and which initiates the comparison after the lapse of a predetermined time period which started with the increase of the data transmission rate.

This measures have been approved advantageous in view of the function of the fieldbus system.

In a preferred embodiment, the fieldbus system is a serial bus, preferably a CAN-bus.

CAN-buses are already used as mentioned on a large scale so that the respective controller units, for example bus controllers, are available as standard units for building up a fieldbus system according to the present invention at low costs.

In a preferred embodiment, the subscriber comprises a detection device which detects the data transmission rate and sets the data transmission rate of the subscriber in response thereto.

This measure has the advantage that a subscriber may be connected to the fieldbus system without having to restart the fieldbus system. Rather, the subscriber detects or senses the data transmission rate on the fieldbus and then adjusts its own transmission rate accordingly. With other words, the subscriber newly connected synchronizes on the running fieldbus without interrupting the fieldbus. As soon as the subscriber has found the proper data transmission rate, it logs on at the central unit.

Further advantages and embodiments of the invention will be apparent from the description and the attached drawings.

It is understood that the features recited above and those yet to be explained below can be used not only in the respective combination indicated, but also in other combinations or in isolation, without departing from the scope of the present invention.

BRIEF DESCRIPTION OF THE DRAWINGS

The invention will now be explained in more detail by means of an embodiment and with reference to the drawings. In the drawings.

DETAILED DESCRIPTION OF PREFERRED EMBODIMENTS

Figure 1:
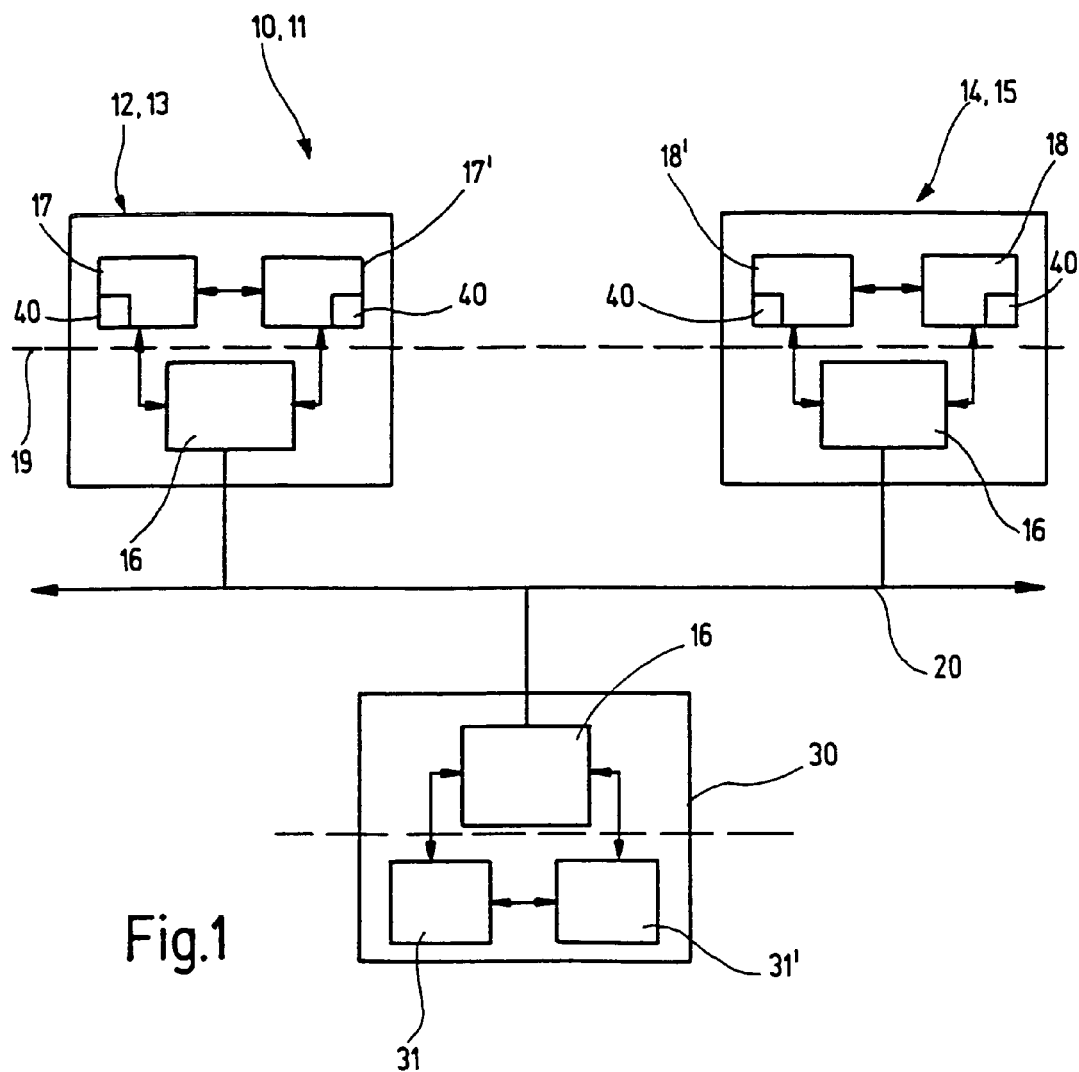
FIG. 1 shows a block diagram of a fieldbus system according to the present invention with two subscribers and a central unit.

In FIG. 1, a safe fieldbus system with bus subscribers being linked thereto is indicated by reference numeral 10. The fieldbus system 10 is provided as a so-called CAN-fieldbus system 11 (hereinafter called bus system) in the present embodiment.

The bus system 11 comprises a plurality of bus subscribers 12, 14 being electrically linked together by a so-called fieldbus 20 (hereinafter also called bus). In a CAN-bus system, the bus is provided as a two-wire line.

The bus subscribers 12, 14 can be so-called control units (also called client) or so-called signal units (also called server). Merely as example, it is assumed that the bus subscriber 12 is a control unit 13 and the bus subscriber 14 is a signal unit 15.

Such a bus system 11 is for example suitable for controlling particular processes. The control program necessary for controlling runs in the control unit 13 which is supplied with data, for example measuring values, by signal units 15, which processes these data and transmits respective control signals to signal units 15. Signal units 15 may for example be connected to sensors and/or actuators. Generally, the signal units also serve as input/output-units (E/A-units), whereas the control units 13 conduct the processing of the measuring values and cause the performance of specified actions in response thereto.

The communication of the bus subscribers 12, 14, i.e. the transmission of data via the bus 20, is governed by specified rules, so-called protocols. In the present embodiment, the data transmission is carried out according to the CAN-protocol which is generally known and is therefore not further described herein.

Each bus subscriber 12, 14 comprises a so-called controlling module 16 for controlling the data traffic of the bus 20, the controlling module 16 providing the link to the bus 20 and packaging the data into data frames according to the protocol and sending them to the bus 20 for transmission. The controlling module 16 is provided as a standard element which is offered by different manufacturers. The structure of this element should therefore not be described hereinafter.

The data to be transmitted, for example measuring signals or control instructions are provided by units 17, 18. These units 17, 18 may perform different functions and may therefore be designed differently. In the present embodiment, it is assumed that the unit 17 assigned to the control unit 13 is designed as microcontroller which performs calculations according to specified algorithms, while the unit 18 assigned to the signal unit 15 is provided as an A/D-converter for example, which converts measuring signals supplied by a sensor in digital signals.

FIG. 1 shows that the control unit 13 as well as the signal unit 15 are provided with further units 17' and 18'. Both additional units 17', 18' shall perform the same functions as the respective units 17 and 18, respectively, do as to achieve a redundant system. Dependent on the application, the additional units 17', 18' are designed identically to the units 17 and 18, respectively (redundant system). Dependent on the application, the units 17, 17' and 18, 18' may also be designed as diverse systems, wherein the additional units 17' and 18' each having the same functionality are designed with different processors or processors of different manufacturers compared with the units 17, 18.

These redundant or diverse systems 17, 17' and 18, 18', respectively, continuously check themselves and immediately signal a fault in the event that inconsistencies occur. Further, they ensure that the bus subscribers 12, 14 do not break down completely if one of the units 17, 18 breaks down, so that it is possible to switch off in a definite way.

As it is apparent from the known CAN-protocols, the controlling modules 16 perform error checks as to detect faulty data transmission. One example of an error check is for example the so-called "cyclic redundancy check" (CRC).

As to use such a bus system also to control safety critical processes, further measures are necessary in addition to the afore-mentioned error check by the controlling modules 16 to increase safety. These additional error checking- and error correction mechanisms are implemented in the units 17, 17'0 and 18, 18'. For example, the mechanisms may be additional CRC-calculations. Further tasks of the units 17, 17', 18 and 18' are for example the monitoring of other safety relevant parameters, for example response time of the bus subscriber or time-outs also. It is refrained from describing these mechanisms in more detail since it is not required for an understanding of the invention. The units 17, 17', 18 and 18' ensure together with the controlling modules 16 that a nearly hundred percent fault safety and a high error detection degree, respectively, is achieved.

In FIG. 1, a broken line 19 is shown, which separates both bus subscribers 12, 14 in an upper safe part and a lower part not being safe (unsafe part). The unsafe part comprises the controlling module 16 as well as the bus 20. The safe part comprises the units 17, 17', 18, 18', which monitor themselves and the data traffic over the bus 20 with a very low likelihood of undetected errors.

The data transmission via the bus 20 is performed with a predetermined rate, the so-called data transmission rate. As to allow a communication of the bus subscribers 12, 14, the data transmission rates used by the bus subscribers linked to the bus have to be equal. A data transmission with different data transmission rates is not allowed by the CAN-bus system 11.

In safe bus systems, the data transmission rate has to be selected such that the response time of the bus subscribers does not exceed a predetermined value. The mentioned response time is also determined particularly by availability of the bus 20. In this respect, it is generally to be noted that the load of the bus decreases when the data transmission rate is increased. Hence, also the time period is reduced for which a bus subscriber 12, 14 has to wait as to transmit data via the bus 20.

The highest adjustable data transmission rate is however limited by the local extension of the bus 20. With an increase of the length of the bus 20, i.e. with an increase of the distance between the bus subscribers 12, 14, the admissible, i.e. the data transmission rate determined as safe, decreases due to the characteristic of the electrical lines of the bus 20.

As to set the data transmission rate of the bus 20, a central unit (also called management device) is provided according to the present invention. This central unit 30 is connected to the bus 20 and is provided only once in the bus system 11. It performs the adjustment of the data transmission rate for all subscribers 12, 14 connected to the bus 20. It is of course also possible that the bus subscribers 12, 14 may be divided in groups and are accessed groupwise via the central unit 30.

The central unit 30 is also divided in a safe part and an unsafe part like the bus subscribers 12, 14. The unsafe part also comprises a controlling module 16, which performs the management of the data transmission via the bus 20. In addition to this controlling module 16, a redundant diverse system having two units 31, 31' is provided. Both units 31, 31' have the same functionality which will be described in more detail below.

Figure 2:
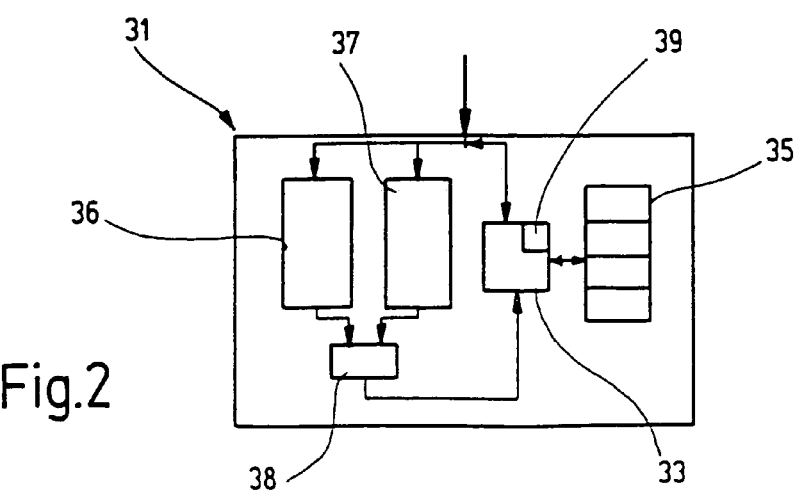
FIG. 2 shows a block diagram of a unit of the central unit.

In FIG. 2, the structure of the unit 31 is shown. The unit 31 comprises a controlling unit 33 which is connected to a first memory unit 35. The memory unit 35 comprises a plurality of memory cells for storing data.

The controlling unit 33 is also connected to further memory units 36, 37, which are adapted to store so-called log-on data. Both memory units 36, 37 are in turn connected to a comparator unit 38, which supplies a output signal to the controlling unit 33. Finally, the controlling unit 33 is also provided with a so-called timer module 39.

Figure 3:
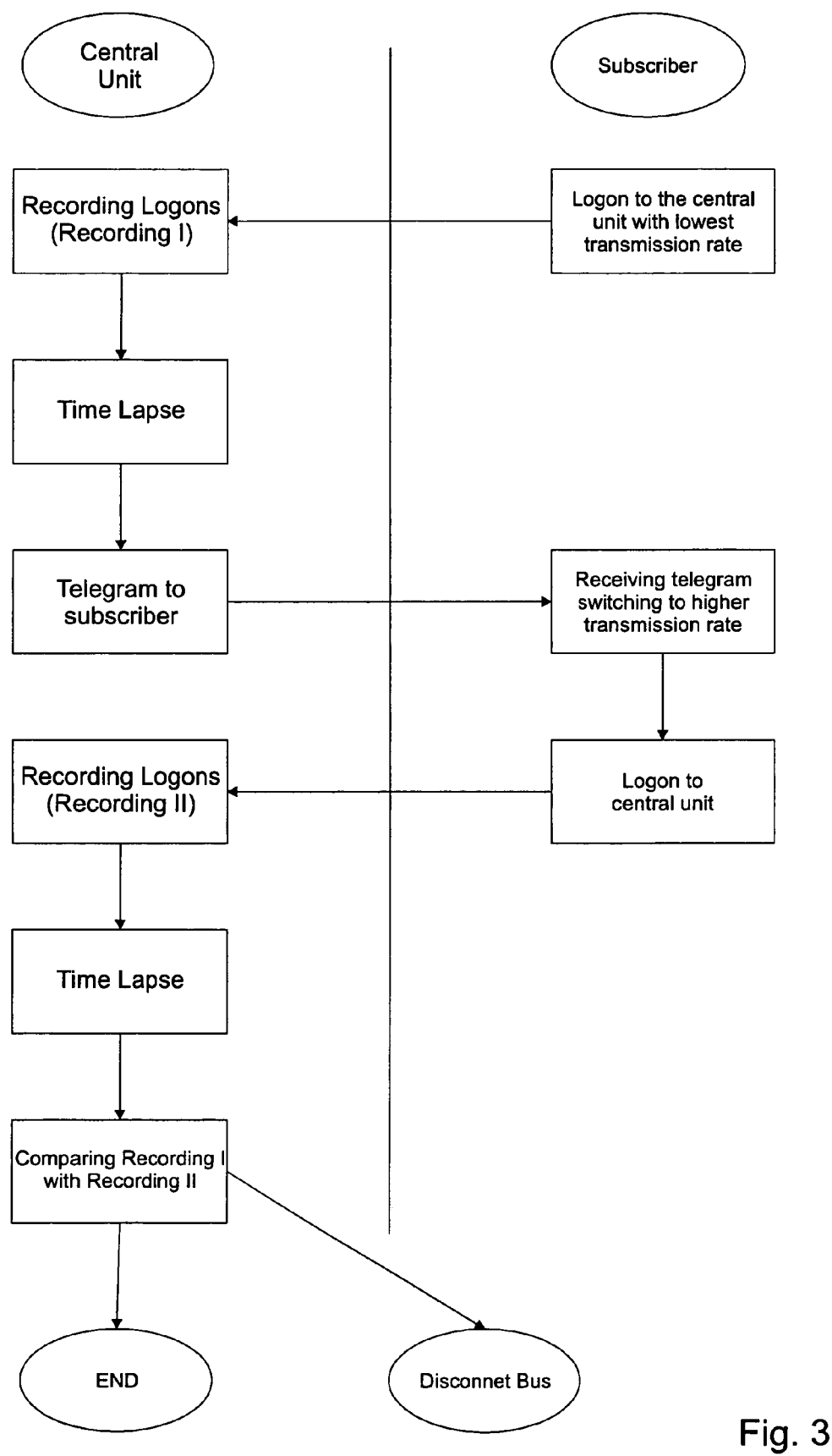
FIG. 3 shows a flow diagram for explaining the method according to the present invention.

The central unit 30 and particularly the unit 31 performs the following function which will be described with reference to the flow diagram shown in FIG. 3.

When starting the bus system 11, that is when switching on all bus subscribers 12, 14, 30, the controlling module 16 sets a low predetermined data transmission rate, preferably 20 kBaud. This low value (default value) is stored in a memory cell of the memory unit 35 of the central unit as well as in respective memory cells (not shown) of the bus subscribers 12, 14. The selected value should ensure that all bus subscribers 12, 14 connected to the bus 20—regardless of the extension of the bus 20—are able to communicate with each other. The electrical characteristic of the lines forming the bus should not cause any negative effects at this low data transmission rate.

The bus subscribers 12, 14 transmit with the low data transmission rate data telegrams via the bus 20 in a first phase, the data telegrams being all addressed to the central unit 30. These data telegrams comprise data which allow a recognition and identification, respectively, of the transmitting bus subscribers 12, 14. These so-called log-on data are received by the central unit 30 and stored in the second memory unit 36.

After the lapse of a predetermined time period, which is determined by the timer module 39 and which is measured starting with the last storage of log-on data, the controlling unit 33 reads out of the first memory unit 35 data which have been stored there before switching on the bus system. These data represent a value of a data transmission rate which corresponds to the maximum admissible data transmission rate with respect to safety-directed aspects. These data and this value, respectively, is packed into a data telegram and is transmitted via the bus 20 to all bus subscribers 12, 14.

The bus subscribers 12, 14 receive this data telegram (for example a so-called broadcast telegram being addressed to all subscribers) and process the data comprised therein such that the set data transmission rate is set to the new value. The afore-mentioned data telegram is yet transmitted by the central unit 30 using the low data transmission rate.

After having received the data telegram and after completion of the adjustment of the data transmission rate to the higher value, preferably 200–250 kBaud, the bus subscribers 12, 14 logs on again at the central unit 30. For this, they send data telegrams comprising log-on data and being addressed to the central unit 30 using the higher data transmission rate. The log-on data are stored in the third memory unit 37.

As soon as the time period measured by the timer module 39 exceeds a predetermined value after having received the last data telegram, the controlling unit 33 sends the instruction to the comparator unit 38 to compare the log-on date stored in the memory units 36, 37 with each other. In case that it is determined that any bus subscribers have not logged on after having set the higher data transmission rate, the controlling unit 33 concludes that an error has occurred and shuts down the bus system immediately, so that the controlled safety-critical processes may be transferred into a safe state.

One possible fault or error may be for example that one bus subscriber is located too far away from the central unit 30 for using the higher data transmission rate. As to remedy this error, it is necessary that the bus system is operated with a lower data transmission rate. Such a lower value is stored in a further of the memory cells of the memory unit 35.

During the next restart of the bus system 11 which is necessary due to the afore-described error-caused switching-off, the afore-mentioned method for adjusting the data transmission rate is now performed once again, however, the next lower value as value for the data transmission rate being red out of the memory unit 35. It is of course also possible to set this lower value manually before the restart and not to access to stored values.

If a consistency between the log-on data stored in both memory units 36, 37 is determined during the above-mentioned comparison, the bus system 11 can be operated with the set data transmission rate. All bus subscribers are able to communicate on the basis of this data transmission rate.

As to increase the safety of the bus system, the central unit 30 is checked cyclically whether all subscribers registered in the beginning are still on-line, that is ready for transmission and reception. This check is performed in that the central unit 30 transmits a data telegram via the bus 20 comprising the instruction for the bus subscribers 12, 14 to send back log-on data. These log-on data are in turn stored in the third memory unit 37 and are compared with the log-on data stored in the beginning after the lapse of a time period determined by the timer module 39. An inconsistency of the log-on data results in an immediate shut-down of the bus system 11, whereas a consistency of the data will not cause any further action.

In case that bus subscribers 12, 14 shall be connected during operation of the bus system 11 using the higher data transmission rate, the units 17, 17', 18 and 18' comprise a data transmission rate-detection unit 14. This detection unit 14 serves to detect the data transmission rate used on the bus 20 and to set the controlling module 16 accordingly. Afterwards, the new subscriber 12, 14 transmits a data telegram to the central unit 30 in order to log on. In this case, the respective log-on data are stored in the second memory unit 36. During the next cyclical check whether all bus subscribers are ready for transmission and reception, the log-on data of the newly connected bus subscriber are then stored in the third memory unit 37 so that the comparison can lead to a consistency.

As already mentioned before, the first memory unit 35 comprises a plurality of memory cells which can receive different values of data transmission rates. These data transmission rates can be set before putting the central unit 30 into operation. It is of course also possible to change these values during operation. Typical values for stored data transmission rates are 20 kBaud as standard-starting value, 50 kBaud, 100 kBaud, 125 kBaud, 150 kBaud, 200 kBaud, 250 kBaud and 500 kBaud. A different graduation is of course also possible.

In view of this, it is apparent that the fieldbus system according to the present invention allows a very simple adjustment of defined safe data transmission rates for all bus subscribers. The manual adjustment of the bus subscribers is not necessary any more. Moreover, all values important for the safety, like response times, transmission errors, time-outs, etc. are monitored in a safety-relevant way also during the adjustment of the data transmission rate. Variations of the performance of the bus system have therefore no influence.

It is to be understood that the functionality of the central unit 30 may be combined with the functionality of other bus subscribers without leaving the scope of the present invention. It is contemplated that the central unit 30 may be integrated in a control unit 13. Moreover, it is also possible to design the unit 31 in a way different to that shown in FIG. 2 as to achieve the same functionality.

What is claimed is:

1. Method for adjusting the data transmission rate in a fieldbus system which is suitable to control safety-critical processes and which comprises at least one subscriber connected to a fieldbus, wherein in a first phase the subscriber/subscribers log on at a unit (central unit) centrally connected to the fieldbus with a first low data transmission rate; in a second phase the central unit sets the data transmission rate at the subscriber/subscribers to a predetermined higher second value; in a third phase the subscriber/subscribers log on again at the central unit with a higher data transmission rate; and the central unit shuts down the fieldbus if it detects a deviation of the number of subscribers logged on in the first and the third phase.

2. Method according to claim 1, wherein the first phase is started with switching on the fieldbus system.

3. Method according to claim 1, wherein in the second phase the central unit transmits data telegrams to all subscribers, the data telegrams comprising the instruction to switch the data transmission rate to the second value.

4. Method according to claim 1, wherein the central unit terminates the third phase when a predetermined time period has lapsed since the last log-on of one of the subscribers without a new log-on of one of the subscribers.

5. Method according to claim 1, wherein the first value of the data transmission rate is a standard transmission rate and the second value corresponds to the target value of the fieldbus system.

6. Method according to claim 1, wherein a new subscriber being connected to the fieldbus after termination of the third phase detects the data transmission rate on the fieldbus and logs on at the central unit with this data transmission rate.

7. Fieldbus system for controlling safety-critical processes, comprising a fieldbus to which at least one subscriber is connected, a central unit communicating with the subscribers via the fieldbus and having a switching device for centrally switching the data transmission rate on the fieldbus and at the subscribers from a first low value to a second higher value wherein the central unit comprises:

a first memory unit which stores the first and second values of the data transmission rate;

a second and a third memory unit for storing log-on data, the log-on data being supplied by the subscribers connected to the fieldbus; and a comparator device which compares the log-on data stored in the second and the third memory unit, the central unit performing a shut-down of the fieldbus in case of an inconsistency.

8. Fieldbus system according to claim 7, wherein the central unit comprises a time measuring device which is connected to the comparator device and which initiates the comparison after the lapse of a predetermined time period since the data transmission rate has been set to a higher value.

9. Fieldbus system according to claim 7, wherein the fieldbus is a serial bus.

10. Fieldbus system according to claim 7, wherein the fieldbus is a CAN-bus.

11. Fieldbus system according to claim 7, wherein the subscriber comprises a detection device for detecting the data transmission rate on the fieldbus and for adjusting the data transmission rate of the subscriber in response thereto.

* * * * *